United States Patent
Kloper et al.

(10) Patent No.: US 10,455,439 B2
(45) Date of Patent: Oct. 22, 2019

(54) ROAMING AND PROBE RESPONSES WITH REMOTE RADIO HEADS

(71) Applicant: Cisco Technology, Inc., San Jose, CA (US)

(72) Inventors: David S. Kloper, Santa Clara, CA (US); Matthew A. Silverman, Shaker Heights, OH (US); Paul J. Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 15/495,503

(22) Filed: Apr. 24, 2017

(65) Prior Publication Data

US 2018/0310191 A1    Oct. 25, 2018

(51) Int. Cl.
| | |
|---|---|
| *H04W 24/08* | (2009.01) |
| *H04W 48/16* | (2009.01) |
| *H04W 48/14* | (2009.01) |
| *H04W 48/20* | (2009.01) |
| *H04W 88/08* | (2009.01) |

(52) U.S. Cl.
CPC ........... *H04W 24/08* (2013.01); *H04W 48/14* (2013.01); *H04W 48/20* (2013.01); *H04W 88/085* (2013.01)

(58) Field of Classification Search
CPC ..... H04L 47/10; H04L 43/50; H04L 12/2697; H04L 43/0852; H04L 43/00
USPC ........................................................ 370/252
See application file for complete search history.

(56) References Cited

U.S. PATENT DOCUMENTS

| | | | | |
|---|---|---|---|---|
| 7,805,140 | B2 * | 9/2010 | Friday | H04W 48/20 370/338 |
| 8,223,862 | B2 | 7/2012 | Al-Naffouri et al. | |
| 8,265,052 | B2 | 9/2012 | Abhishek et al. | |
| 8,570,971 | B2 * | 10/2013 | Bhattad | H04W 28/18 370/329 |
| 8,892,722 | B1 * | 11/2014 | Kopikare | G06F 15/173 370/329 |
| 8,942,221 | B2 * | 1/2015 | McCann | H04W 48/12 370/349 |
| 9,008,722 | B2 * | 4/2015 | Tarraf | H04W 88/06 455/115.1 |
| 9,178,722 | B1 * | 11/2015 | Gong | H04W 36/0088 |
| 9,319,968 | B2 * | 4/2016 | Montemurro | H04W 48/16 |
| 2007/0002884 | A1 * | 1/2007 | Jaakkola | H04W 48/16 370/431 |
| 2007/0041310 | A1 | 2/2007 | Tulino | |
| 2008/0080388 | A1 * | 4/2008 | Dean | H04L 43/16 370/252 |

(Continued)

*Primary Examiner* — Gbemileke J Onamuti
*Assistant Examiner* — Sanjay K Dewan
(74) *Attorney, Agent, or Firm* — Patterson + Sheridan, LLP

(57) ABSTRACT

The present disclosure discloses a central controller controlling multiple radio heads (RHs) in a network. The central controller generates network information for the radio heads based on a probe request transmitted from a network device and received by one or more of the radio heads. The central controller calculates a respective metric value for each of the radio heads based on the network information. The metric value indicates a capability of a radio head to serve the network device. The central controller selects a subset of radio heads from the multiple radio heads to send a probe response to the network device based on the metric values.

20 Claims, 8 Drawing Sheets

(56) References Cited

U.S. PATENT DOCUMENTS

| | | | |
|---|---|---|---|
| 2008/0151774 A1* | 6/2008 | Vogel | H04L 41/22 |
| | | | 370/252 |
| 2011/0222424 A1* | 9/2011 | Abhishek | H04W 72/02 |
| | | | 370/252 |
| 2012/0008489 A1* | 1/2012 | Higuchi | H04L 5/0007 |
| | | | 370/203 |
| 2013/0182611 A1* | 7/2013 | Kneckt | H04W 8/005 |
| | | | 370/255 |

* cited by examiner

ROAMING AND PROBE RESPONSES WITH REMOTE RADIO HEADS

BACKGROUND

In a Wi-Fi network, a client device, e.g., a cell phone, maybe connected to or associated with an access point (AP) to utilize the Wi-Fi service. In order to identify the available AP, it is common practice to send Probe Requests. In a high density environment, each such request might solicit Probe Responses from multiple APs. Since these frames are sent at low data rate, these Probe requests and responses can use a large amount of the Air Time on the channel, while most of them would not indicate the AP best able to service the Client. Even after a client device is connected to an AP, some client devices tends to keep the connection with that AP, even when there is another AP available that can provide better Wi-Fi service such as higher signal quality and/or higher data rate to the client device. For example, when a client device is moving from a first location to a second location of the Wi-Fi network, the client device may still tend to keep the connection with the AP at the first location, while another AP at the second location can provide better Wi-Fi service to the client device.

SUMMARY

One embodiment of the present disclosure provides a central controller. The central controller includes an I/O interface coupled to a plurality of radio heads. Each radio head includes at least one antenna and at least one transceiver. The central controller also includes a processor and a memory. The memory contains a program that, when executed on the processor, performs an operation. The operation includes receiving a first probe request from a network device at a first set of the plurality of radio heads on a first channel; generating network information for the first set of the plurality of radio heads based on the first probe request; calculating first respective metric values for the first set of the plurality of radio heads based on the network information; calculating second respective metric values for a second set of the plurality of radio heads based on receiving a plurality of frames from the network device using the second set of the plurality of radio heads before the first set of the plurality of radio heads receive the first probe request; selecting at least one radio head from the first and the second set of the plurality of radio heads based on comparing the first and second respective metric values; and sending at least one probe response to the network device in response to the first probe request using the selected radio head from the first set.

One embodiment of the present disclosure provides a computer program product that includes a non-transitory computer-readable storage medium having computer readable program code embodied therewith. The computer readable program code receives a first probe request from a network device at a first set of the plurality of radio heads on a first channel; generates network information for the first set of the plurality of radio heads based on the first probe request; calculates first respective metric values for the first set of the plurality of radio heads based on the network information; calculates second respective metric values for a second set of the plurality of radio heads based on receiving a plurality of frames from the network device using the second set of the plurality of radio heads before the first set of the plurality of radio heads receive the first probe request; selects at least one radio head from the first and the second set of the plurality of radio heads based on comparing the first and second respective metric values; and send at least one probe response to the network device in response to the first probe request using the selected radio head from the first set.

One embodiment of the present disclosure provides a method. The method includes receiving a first probe request from a network device at a first set of the plurality of radio heads on a first channel; generating network information for the first set of the plurality of radio heads based on the first probe request; calculating first respective metric values for the first set of the plurality of radio heads based on the network information; calculating second respective metric values for a second set of the plurality of radio heads based on receiving a plurality of frames from the network device using the second set of the plurality of radio heads before the first set of the plurality of radio heads receive the first probe request; selecting at least one radio head from the first and the second set of the plurality of radio heads based on comparing the first and second respective metric values; and sending at least one probe response to the network device in response to the first probe request using the selected radio head from the first set.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure discloses a central controller controlling multiple RHs in a network. One advantage of the present disclosure is that the central controller steers the client device to connect through the best or most suitable RH to serve the client device. In another embodiment, the central controller provides multiple candidate BSSIDs serviced through multiple RHs for the client device to choose. In one embodiment of the present disclosure, functions of an AP are split into two parts. The central controller provides the digital part of the physical (PHY) layer function for baseband processing and the media access control (MAC) layer function of an AP. The central controller controls multiple RHs that are coupled to the controller, which may provide multiple BSSIDs on multiple channels. Each RH provides the analog part of the PHY layer function for transmitting and receiving radio frequency (RF) signals in a frequency band. In one embodiment, in response to a probe request from a client device, the central controller selects a best or most suitable RH from the multiple RHs to send a probe response to the client device so that the client device may connect through the best or most suitable RH. In another embodiment, in response to a probe request from the client device, the central controller selects more than one candidate RHs from the multiple RHs to send respective probe responses to the client device so that the client device can choose which one of the candidate BSSIDs serviced through the RHs to connect to. With the present disclosure, only the best RHs may respond to the probe request sent by the client device, which can reduce the flooding of probe responses in the network, and focus the client device on selecting from fewer better candidates. Various embodiments of the present disclosure are described in more details below.

Figure 1:
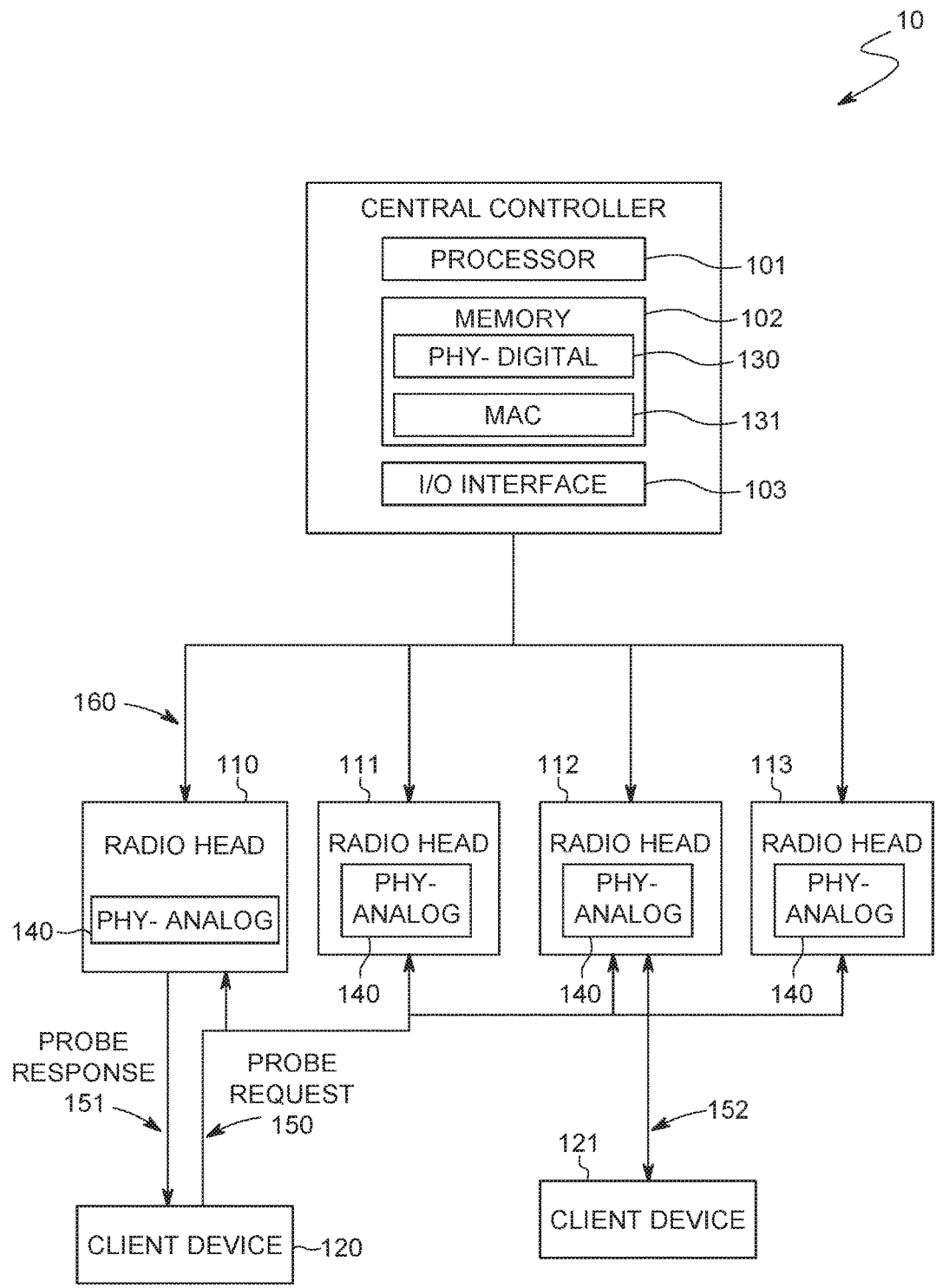
FIG. 1 illustrates a wireless network with a central controller and multiple RHs, according to one embodiment herein.

FIG. 1 illustrates a wireless network with a central controller and multiple RHs, according to according to one embodiment herein. As shown in FIG. 1, the wireless network 10 includes a central controller 100 which includes a processor 101, a memory 102 and an I/O interface 103. The processor 101 may be any computer processor capable of performing the functions described herein. Although the memory 102 is shown as a single entity, the memory 102 may include one or more memory devices having blocks of memory associated with physical addresses, such as random access memory (RAM), read only memory (ROM), flash memory or other types of volatile and/or non-volatile memory.

In one embodiment, the memory 102 includes the digital part of the PHY layer function (hereinafter referred to as "PHY-Digital function 130") of an access point (AP). The memory 107 also includes the MAC layer function 131 of an AP. In one embodiment, the PHY-Digital function 130 of an AP includes PHY layer function for baseband processing of digital signals such as channel estimation, modulation/demodulation and coding/decoding, as understood in the art. In one embodiment, the MAC layer function 131 of an AP includes channel access control mechanisms such as distributed coordination function (DCF), point coordination function (PCF) and collision avoidance, as understood in the art. In one embodiment, the central controller 100 performs part or all of the PHY-Digital function 130 and the MAC layer function 131 for all the RHs controlled by the central controller 100. In one embodiment, the central controller 100 is located in a chassis which includes data ports for establishing wired connections to all the RHs. In other embodiments, the PHY-Digital function 130 and the MAC layer function 131 can be hardware, firmware or combinations of software and hardware. For example, the PHY-Digital function 130 and the MAC layer function 131 may include hardware components on the processor 101 (e.g., a network processor).

As shown in FIG. 1, the RHs include and perform the analog part of the PHY layer function (hereinafter referred to as "PHY-Analog function 140") of an AP. In one embodiment, the PHY-Analog function 140 includes transmitting/receiving radio frequency (RF) signals in a frequency band, as understood in the art. In one embodiment, the RHs are connected to the central controller 100 through wired connections 160, e.g., Ethernet cables. In one embodiment, the RHs communicate information with the central controller 100 through the I/O interface 103. In one embodiment, the I/O interface 103 is an Ethernet to digital I/O interface. In one embodiment, the RHs are geographically distributed in an area, e.g., a building, to provide RF coverage of the wireless network 10.

Moreover, as shown in FIG. 1, the wireless network 10 includes multiple client devices, e.g., client devices 120 and 121. The client devices 120 and 121 may include cell phones, laptops, tablets and other network devices utilizing the network service, as understood in the art.

In one embodiment, the central controller 100 does not include and perform the analog part of the PHY layer function of an AP, i.e., only the RHs include and perform the analog part of the PHY layer function of an AP. In one embodiment, the RHs do not include and perform the digital part of the PHY layer function and the MAC layer function of an AP, i.e., only the central controller 100 includes and performs the digital part of the PHY layer function and the MAC layer function of an AP. In one embodiment, the RHs are configured to provide the analog part and the digital part of the PHY layer function and the MAC layer function of an AP. It is understood that any or all of the PHY-Digital function may also be included in the RHs depending on system partitioning.

In one embodiment, the client device 120 sends a probe request 150 indicating that the client device 120 is seeking to connect to the wireless network 10, or determine if a better connection is available. As shown in FIG. 1, all the RHs 110, 111, 112 and 113 receive the probe request 150. The RHs 110, 111, 112 and 113 send the waveform containing the received probe request to the central controller 100 through the wired connections 160. The central controller 100 determines the most suitable RH among the RHs to send a probe response to the client device 120 based on the received probe request, as well as historical information of probe requests received either by other RHs and/or on other channels. The central controller 100 then selects the most suitable RH to send the probe response to the client device 120, after which the client device 120 may connect through the selected RH to access the wireless network 10.

For example, the central controller 100 may determine that the RH 110 is the most suitable RH to send a probe response to the client device 120 based on the received probe request. The central controller 100 then selects the RH 110 to send the probe response 151 to the client device 120, as shown in FIG. 1. After receiving the probe response 151 transmitted through the RH 110, the client device 120 may connect through the RH 110 to access the wireless network 10.

Like the client device 120, the client device 121 can also send a probe request received through some or all of the RHs. In FIG. 1, the central controller 100 has already determined that the RH 112 is the most suitable RH to send a probe response to the client device 121 based on the received probe request. The central controller 100 then selects the RH 112 to send the probe response to the client device 121. As shown by arrow 152, after receiving the probe response transmitted through the RH 112, the client device 121 may connect through the RH 112 and bidirectional communication is established between the AP 112 and the client device 121.

FIG. 1 shows one embodiment of the wireless network 10. In other embodiments, the central controller 100 may control a different number of RHs. In other embodiments, a different number of client devices may access the wireless network 10 by connecting to the RHs.

Figure 2:
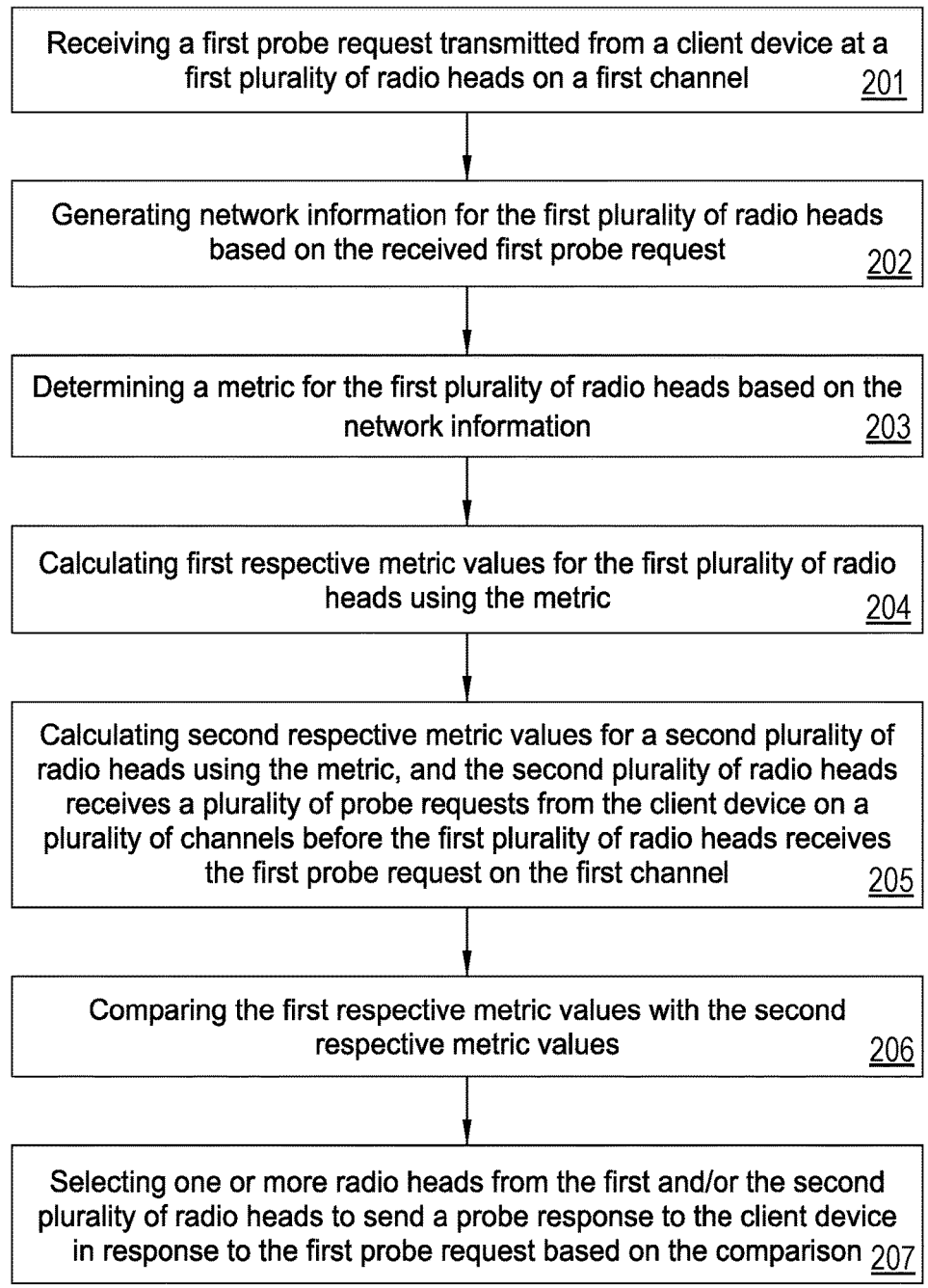
FIG. 2 illustrates a flowchart showing a method to select one or more of the RHs to send a probe response to a client device, according to one embodiment herein.

FIG. 2 illustrates a flowchart showing a method 200 to select one or more of the RHs to send a probe response to a client device, according to one embodiment herein. The method 200 is described using FIG. 1 and FIG. 2.

At block 201, a first plurality of radio heads receive a first probe request transmitted from a client device. In one embodiment, the radio heads receive the first probe request on a first channel. That is, the radio heads operate on the same channel as the client device. For example, as shown in FIG. 1, the RHs 110, 111, 112 and 113 receive a probe request 150 from the client device 120 which all operate on the same channel. In one embodiment, the client device 120 sends the probe request 150 through the RHs when the client device is seeking to connect to the wireless network 10 for the first time. In another embodiment, the client device 120 is already connected to the wireless network 10. In that case, the client device 120 may periodically send probe requests to seek for a better connection to the wireless network 10. In one embodiment, the client device 120 sends the probe request 150 when the client device is seeking to roam from one location to another location covered by the wireless network 10. In one embodiment, not all RHs of the wireless network 10 receive the probe request from the client device. For example, only the one or more RHs operating on the same channel as the client device is scanning and/or the RHs scanning the channel of the client device receive the probe request.

At block 202, the central controller 100 generates network information for the first plurality of RHs based on the received first probe request. In one embodiment, the RHs, e.g., the RHs 110, 111, 112 and 113 in FIG. 1, send the received first probe request (e.g., digitized analog signals) to the central controller 100 through the wired connections 160. The central controller 100 receives the first probe request through the I/O interface 103 to obtain baseband digital signals representing the first probe request received by the RHs. The central controller 100 can measure or obtain network information for the plurality of RHs based on the baseband digital signals representing the first probe request received by the RHs.

In one embodiment, the central controller 100 measures the Received Signal Strength Indicator (RSSI) for each of the RHs based on the baseband digital signals representing the first received probe request by the RHs. In another embodiment, the central controller 100 measures the Signal-to-Interference-plus-Noise Ratio (SINR) for each of the RHs. In another embodiment, the central controller 100 measures the Received Error Vector Magnitude (RxEVM) for each of the RHs. In another embodiment, the central controller 100 measures or estimates the distance between each of the RHs and the client device, e.g., the client device 120 in FIG. 1. In another embodiment, the central controller 100 obtains the transmit characteristics of the device 120, e.g., the supported data rate. In other embodiments, the central controller 100 measures or obtains one or more of the above parameters and/or different network information, as understood in the art.

At block 203, the central controller 100 determines a metric for the first plurality of RHs based on the measured or obtained network information. In one embodiment, the metric indicates the capability of the RHs to service the client device under their current configurations. For example, the metric can indicate the signal quality of the wireless connection between a RH and the client device or the data rate that each RH can provide to the client device.

In one embodiment, the metric includes one parameter included in the measured or obtained network information. For example, the metric can be the measured RSSI value. In another example, the metric can be the estimated distance between an RH and the client device. In another embodiment, the metric includes multiple parameters included in the measured or obtained network information. For example, the metric can be derived from both the measured RSSI value and the estimated distance between an RH and the client device.

In another embodiment, the metric further includes network information not measured or obtained using the probe request received by the RHs. For example, the metric can further include system loading information of the RHs. The system loading information of an RH may indicate that how many client devices are currently connected through the RH, or other metrics on the local RF medium around the RH. Because the central controller 100 controls the RHs and has the operating information of the RHs, the central controller 100 can generate the loading information of the RHs by itself, i.e., not based on the probe request received by the RHs. In another embodiment, the metric includes time information. For example, the metric can include the average of the measured RSSI value for a certain time period, as measured from other frames from the client devices on the same or different channels.

In another embodiment, the metric is a cost function. For example, the metric can be a cost function including both the measured RSSI value and the estimated distance between an RH and the client device. In one embodiment, the cost function can assign different weight values for different parameters. For example, the cost function can assign a weight value of 0.3 to the measured RSSI value and a weight value of 0.7 to the estimated distance between an RH and the client device. The weight value can be a value from 0 to 1 indicating the importance of the parameter in the cost function, as understood in the art.

At block 204, the central controller 100 calculates first respective metric values for the first plurality of RHs by using the determined metric. Each of the calculated respective metric values indicates the capability of a RH, e.g., one of the RHs 110, 111, 112 and 113 in FIG. 1, to serve the client device, e.g., the client device 120 in FIG. 1 and can be derived from any of the network information and techniques described above.

At block 205, the central controller 100 calculates second respective metric values for a second plurality of RHs by using the metric determined at block 203. In one embodiment, the second plurality of RHs receive a plurality of frames, which may include, but are not restricted to probe requests from the client device on a plurality of channels before the first plurality of RHs receive the first probe request on the first channel. For example, the second plurality of RHs (which are also controlled by the central controller 100) may have previously received multiple frames in a recent time period (e.g., within the last minute)

on multiple channels. In one embodiment, the second plurality of RHs may include some or all of the first plurality of RHs. In one embodiment, the second plurality of RHs may be different from the first plurality of RHs. In one embodiment, the plurality of channels may include the first channel. In one embodiment, the plurality of channels may be different from the first channel.

The central controller 100 can calculate the second respective metric values for the second plurality of RHs in a similar way as described above. For example, the central controller 100 can generate and store the network information for the second plurality of RHs, e.g., the RSSI and/or SINR information, based on the previously received multiple probe requests or other frames, as described at block 202. Based on the stored network information, the central controller 100 can calculate the second respective metric values for the second plurality of RHs for the same metrics described above.

At block 206, the central controller 100 compares the first respective metric values with the second respective metric values. At block 207, the central controller 100 selects one or more radios heads from the first and/or the second plurality of radio heads to send a probe response to the client device in response to the first probe request based on the comparison at block 206. For example, the central controller 100 can select the RH with the highest RSSI or SINR or the smallest distance to the client device. In another example, the central controller 100 can select the RH with a maximum or minimum value of the cost function, as understood in the art. In one embodiment, the central controller 100 selects only one or a subset of the radio heads from the first plurality of radio heads for sending probe responses to the client device in response to the first probe request.

In one embodiment, the selected RH is the best or the most suitable RH to serve the client device. For example, after calculating the metric values, the central controller 100 selects the RH 110 to send a probe response to the client device 120. The central controller 100 then generates the probe response including the information of the wireless network 10, e.g., a BSSID of the wireless network 10 and sends a waveform containing the probe response to the RH 110 through the wired connection 160 between the central controller 100 and the RH 110. The RH 110 sends a waveform containing the probe response 151 to the client device 120, as shown in FIG. 1. After receiving the probe response 151 transmitted through the RH 110, the client device 120 may connect through the RH 110 to access the wireless network 10.

In another embodiment, at block 205, the central controller 100 selects more than one candidate RH from the plurality of RHs to send respective probe responses to the client device based on the respective metric values. After receiving the respective probe responses from multiple candidate RHs, the client device can choose to connect through one of the candidate RHs. For example, after calculating the metric values, the central controller 100 selects the RH 110 and the RH 112 as candidate RHs to send respective probe responses to the client device 120. After receiving the probe responses transmitted through the RH 110 and the RH 112, the client device 120 can choose to connect through either the RH 110 or the RH 112. For example, the client device 120 can choose to connect through the RH 110 if the client device 120 desires a higher data rate. In another example, the client device 120 can choose to connect through the RH 112 if the client device 120 desires a better signal quality of the wireless connection.

In one embodiment, the central controller 100 selects multiple candidate RHs to send respective probe responses to the client device 120 using the metric based on the measured or obtained network information. The client device in turn determines which candidate RH to connect through based on factors such as RSSI and QOS basic service set (QBSS) load measured at the client device. In one embodiment, the central controller 100 selects multiple candidate RHs supporting different BSSIDs if the multiple candidate RHs have metric values within a threshold or a tolerance level from a best metric value. In one embodiment, the central controller 100 determines the best metric value from the calculated first and/or second respective metric values. For example, the best value may be the highest RSSI or SINR, or the smallest distance to the client device. In one embodiment, the selection matches a RH per BSSID. In one embodiment, the selection is independently evaluated per service set identifier (SSID) offered by the central controller. That is, for each SSID, the central controller 100 selects one or more RHs based on the metric values of the plurality of RHs. In one embodiment, the central controller 100 performs the selection of RH for each SSID if different SSIDs are provided in the coverage area.

In one embodiment, the selected RHs are not used to send probe responses to the client device. In one embodiment, the central controller 100 selects a RH in a different frequency band or channel than the client device. For example, the client device sends a probe request in the 2.4 GHz frequency band but the central controller 100 determines that the RHs in the 2.4 GHz frequency band are busy and selects a RH in the 5 GHz frequency band as better for sending the probe response to the client device. In such cases no probe response is generated, except to requests in the channel or band providing better coverage for the client device. In this example, the client device can access the network using either the 2.4 GHz frequency band or the 5 GHz frequency band. After receiving the probe response in the 5 GHz frequency band, the client device may connect through the selected RH to access the network using the 5 GHz frequency band.

In one embodiment, the selected RHs do not actually send probe responses in response to the first probe request. For example, after the comparison at block 206, the central controller 100 may determine that the best one or more RHs (e.g., the RHs with the highest metric values) are operating on different channels from the first channel that the client device is scanning. In another example, the RHs that previously receive probe requests from the client device on different channels may have the highest metric values. In such cases, the selected RHs do not actually send probe responses in response to the first probe request. Instead, in one embodiment, the selected RHs send probe responses in response to future probe requests from the client device. For example, the client device may not receive a probe response in response to the first probe request and then later send a second probe request to connect to the network. The selected RHs may send probe responses in response to the second probe request.

In one embodiment, the central controller 100 selects a RH to send a probe response to the client device according to the method 200 when the client device is seeking to connect to the wireless network 10 for the first time. The probe response includes the BSSID offered through the selected RH. After receiving the probe response through the selected RH, the client device may connect through the selected RH to access the wireless network 10 by associating with the BSSID of the selected RH.

In another embodiment, the client device is currently connected to the wireless network 10 by associating with the BSSID serviced by the currently selected RH but the client device periodically sends probe requests to seek for a better connection to the wireless network 10. In one embodiment, the client device sends the probe request at predefined intervals to potentially identify a better connection to the wireless network 10. The central controller 100 selects a RH to send a probe response to the roaming client device according to the method 200. After receiving the probe response through the selected RH, the roaming client device may connect through the selected RH to access the wireless network 10. In one embodiment, the roaming client device remains connects through the selected RH without changing the BSSID, or being aware of the change. In other words, the roaming client device remains associated with the same BSSID, i.e., the BSSID is serviced through both RH, and is unaware that this was not the original RH. In another embodiment, the roaming client device connects through the selected RH by associating with the BSSID serviced through the selected RH where the BSSID(s) serviced by the selected RH are different from the BSSID that the client is currently associated with. Various embodiments of connecting a roaming client device through a selected RH are described in more details below.

Figure 3:
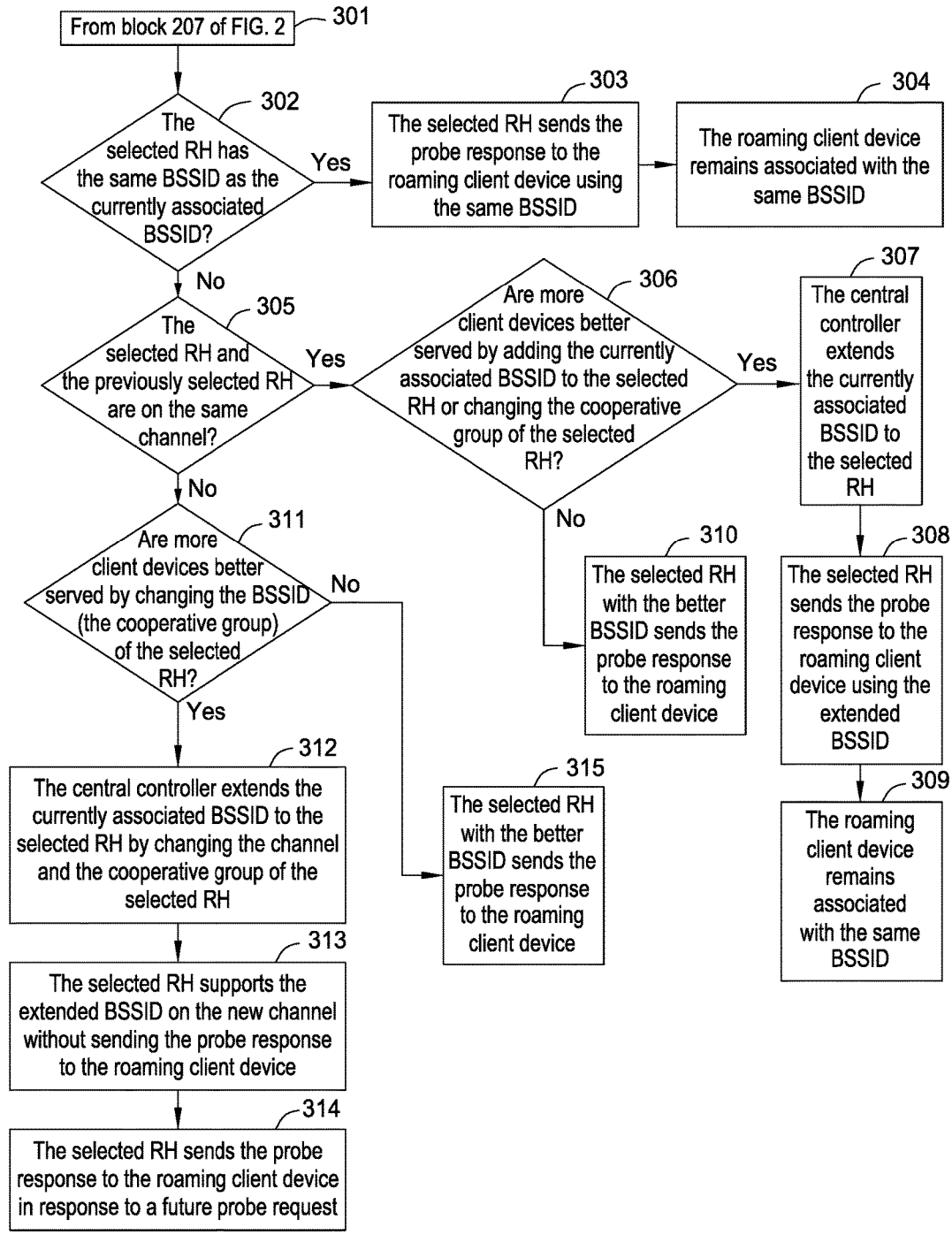
FIG. 3 illustrates a flowchart showing a method to connect a roaming client device to a selected RH, according to one embodiment herein.

FIG. 3 illustrates a flowchart showing a method 300 to connect a roaming client device to a selected RH, according to one embodiment herein. The method 300 is described in parallel with FIGS. 4-6. In particular, blocks 301-304 are first described with FIG. 4.

Figure 4:
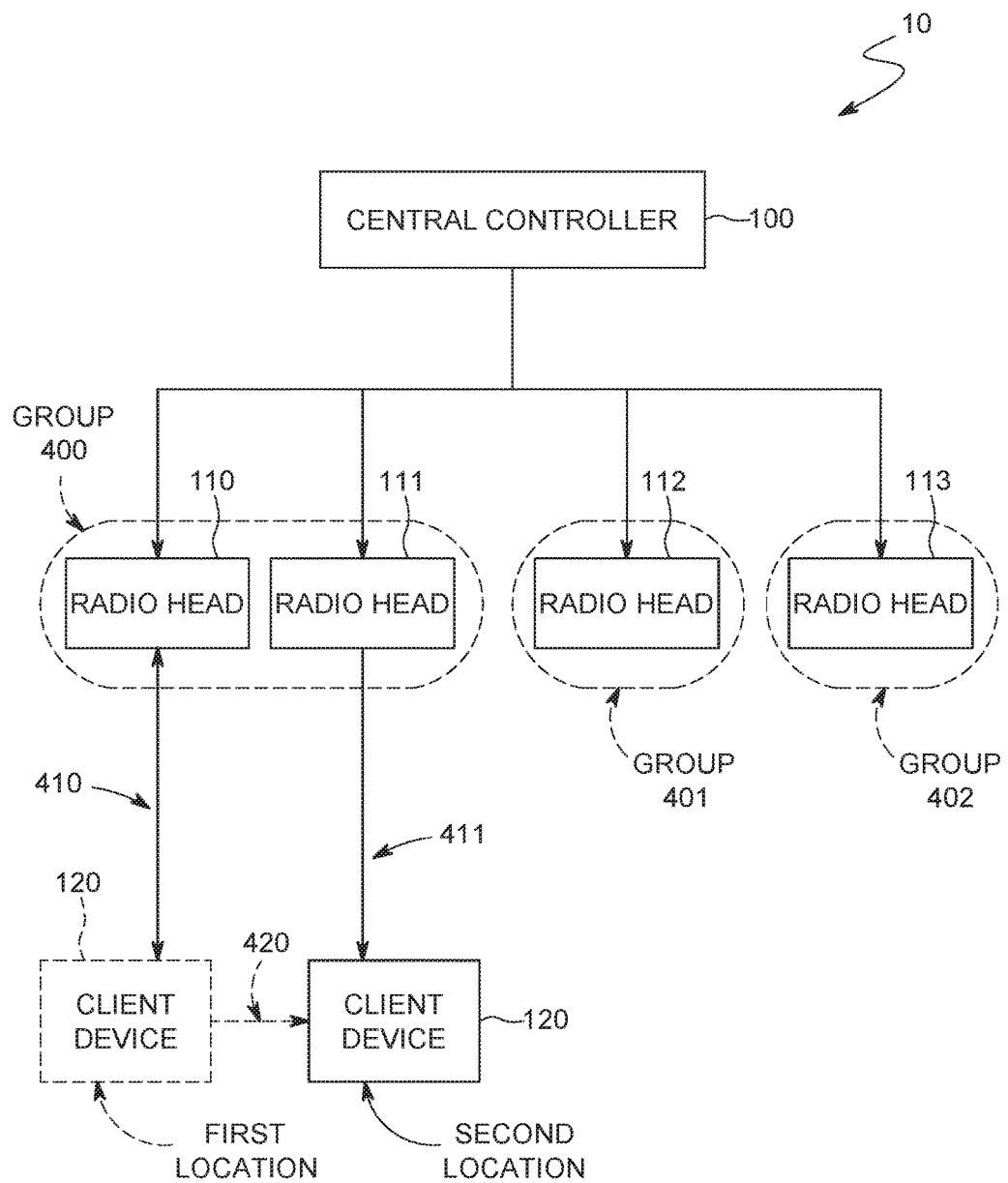
FIG. 4 illustrates that a client device is roaming in the wireless network, according to one embodiment herein. This type of roaming is made transparent to the client device.

FIG. 4 illustrates a client device 120 roaming in the wireless network, according to one embodiment herein. As shown in FIG. 4, the client device 120 is currently connected through the RH 110, as indicated by the bi-directional arrow 410. The client device 120 moves from a first location to a second location of the wireless network 10 (e.g., changes its physical location relative to the fixed position of the RHs), as indicated by the arrow 420. In one embodiment, the first location is within the coverage area of the RH 110 and the second location is within the coverage area of the RH 111. The roaming client device 120 sends a probe request to seek for a better connection to the wireless network 10, corresponding to block 201 of FIG. 2.

The method 300 begins at block 301, which corresponds to block 207 of FIG. 2. That is, it is assumed that the central controller 100 has already selected a RH to send a probe response to the roaming client device 120 in response to the first probe request according to the method 200 as described above. For example, as shown in FIG. 4, it is assumed that the central controller 100 has already selected a new RH (i.e., the RH 111) to send a probe response to the roaming client device 120.

At block 302, the central controller 100 determines whether the selected RH services the currently connected or associated BSSID. In the embodiment shown in FIG. 4, the selected RH 111 and the previously selected RH 110 associated with the current BSSID are within the same cooperative group 400, which means that the selected RH 111 and the previously selected RH 110 are operating cooperatively on the same channel servicing the same BSSID. In other words, the selected RH 111 and the previously selected RH 110 operate to provide one basic service area (BSA) to associated client devices. However, in FIG. 4, the RH 112 is within a different cooperative group 401 but on the same channel as the selected RH 111 and the previously selected RH 110. Further, the RH 113 is within a different cooperative group 402 and on a different channel from the RHs 110, 111 and 112. At block 302, the central controller 100 determines that the selected RH 111 and the previously selected RH 110 service or support the same BSSID. That is, the answer at block 302 is "Yes" and the method 300 proceeds to block 303.

At block 303, the selected RH sends the probe response to the roaming client device in response to the first probe request using the same BSSID. In the embodiment as shown in FIG. 4, the selected RH 111 sends the probe response 411 to the roaming client device 120 when the roaming client device 120 is roaming from the first location to the second location of the wireless network 10. The probe response 411 includes the BSSID of the selected RH 111, which is the same BSSID as the previously selected RH 110. The method 300 then proceeds to block 304.

At block 304, after receiving the probe response through the selected RH 111, the roaming client device 120 may connect through the selected RH 111 without changing the BSSID, or being aware of any change. In other words, the roaming client device 120 remains associated with the same BSSID, i.e., the BSSID of the previously selected RH 110. In this embodiment, switching from communicating with the previously selected RH 110 through the selected RH 111 is transparent to the roaming client device 120. That is, from the perspective of the roaming client device 120, it remains connected to the same BSA of the wireless network 10.

Figure 5A:
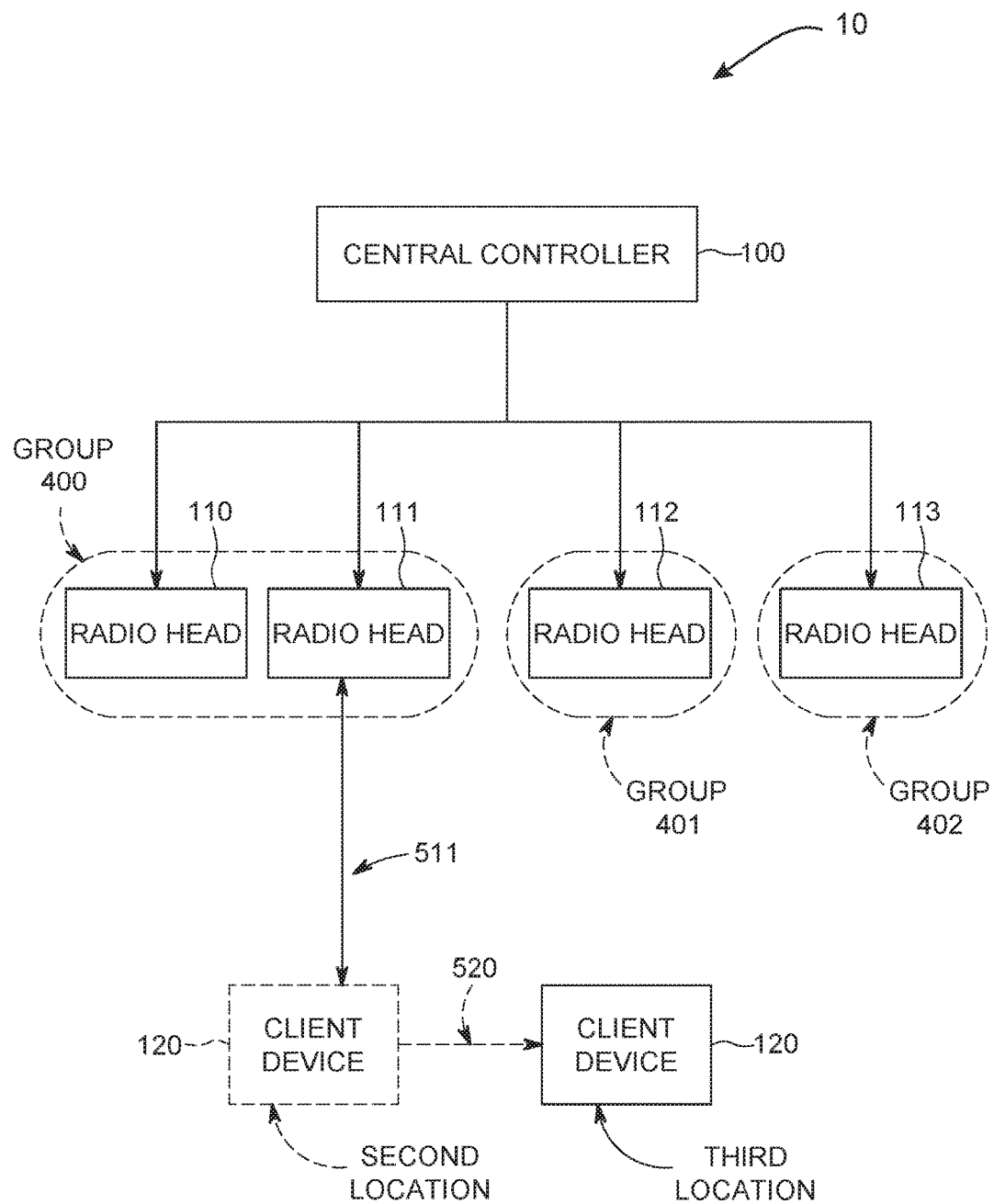
FIG. 5A illustrates that the client device is roaming in the wireless network, according to another embodiment herein.
Figure 5B:
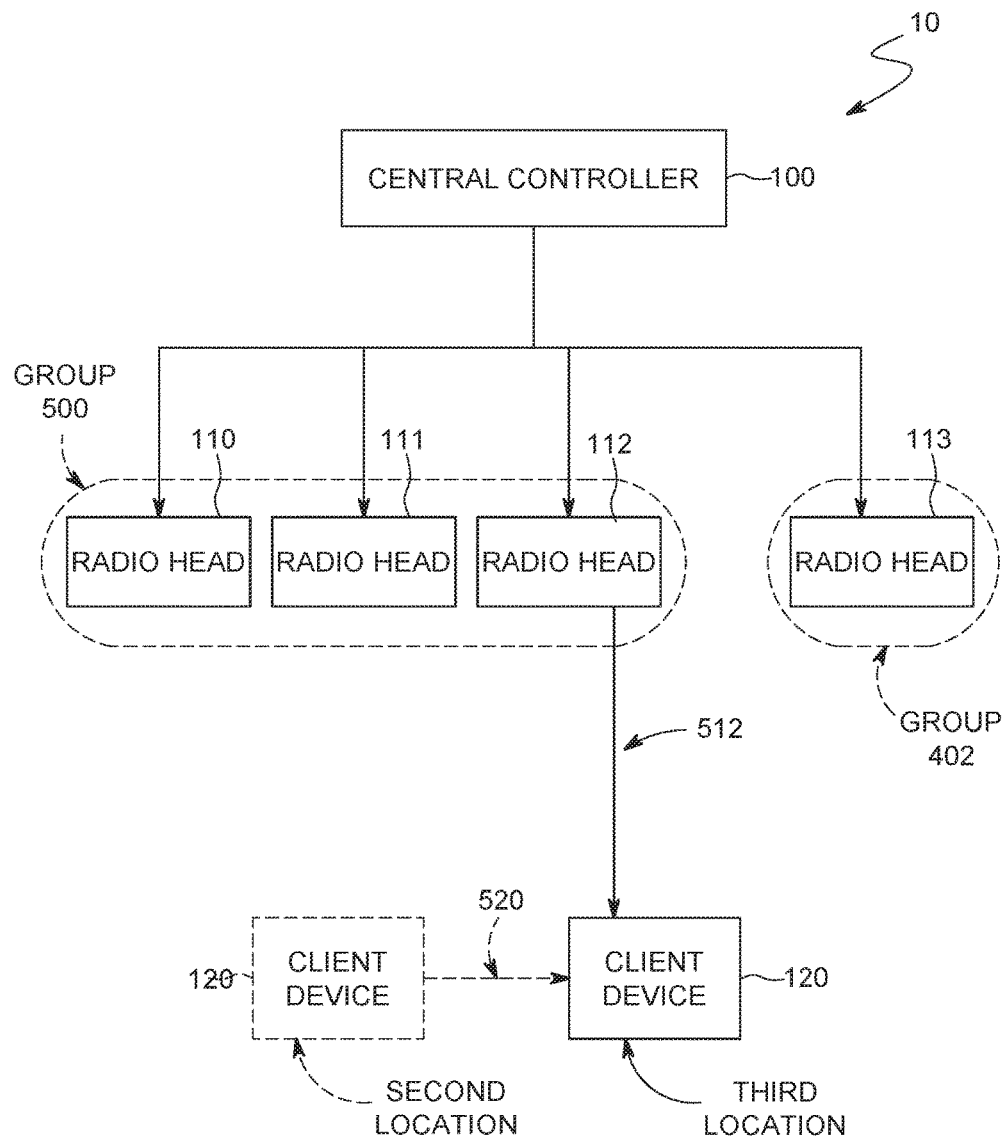
FIG. 5B illustrates that the central controller extends the basic service set identifier (BSSID) of the previously selected RH to the currently selected RH, according to one embodiment herein. This type of roaming is made transparent to the client device.

Returning to block 302, an example of following the "No" logic leg will be described with parallel reference to FIG. 5A-B. In particular, blocks 305-310 will be described with reference to FIG. 5A-B to illustrate an embodiment in which the selected RH and the previously selected RH do not share the same BSSID. In one embodiment, after the roaming client device 120 connects through the RH 111, the roaming client device 120 continues to move from the second location to a third location of the wireless network 10. FIG. 5A illustrates one embodiment that the client device 120 has moved from the second location to a third location of the wireless network 10 as indicated by the arrow 520 but the client device 120 remains connected through the RH 111, as indicated by the bi-directional arrow 511 in FIG. 5A. In one embodiment, the third location is within the coverage of the RH 112. The roaming client device 120 sends a probe request to seek for a better connection to the wireless network 10, corresponding to block 201 of FIG. 2. After receiving the probe request by the RHs 110-113, the central controller 100 performs blocks 202-207 of the method 200 again to select a RH to send a response to the client device 120. In FIG. 5A, after again performing method 200, the central controller 100 has selected the RH 112 to send the probe response to the roaming client device 120 according to the method 200 as described above. However, the selected RH 112 and the previously selected RH 111 are not within the same cooperative group, i.e., the selected RH 112 and the previously selected RH 111 do not have the same BSSID. In FIG. 5A, the previously selected RH 111 is within group 400 including RHs 110 and 111, but the selected RH 112 is within a different cooperative group 401 with a different BSSID. Because the selected RH 112 and the previously selected RH 111 are not within the same cooperative group, the answer at block 302 is "No" and the method 300 then proceeds to block 305.

At block 305, the central controller 100 determines whether the selected RH and the previously selected RH are on the same channel. In FIG. 5A, it is assumed that the selected RH 112 and the previously selected RH 111 are on the same channel. Because the answer at block 305 is "Yes", the method 300 then proceeds to block 306.

At block 306, the central controller 100 determines whether more client devices can be better served by changing the BSSID or the cooperative group of the selected RH. In one embodiment, the central controller 100 changes the BSSID of the selected RH by adding the currently associated BSSID to the selected RH. Changing the BSSID or the cooperative group of the selected RH may better serve some client devices but may negatively impact other client devices. For example, if there are some client devices currently served through the selected RH, changing the BSSID or the cooperative group of the selected RH may negatively impact these client devices. Thus, the central controller 100 makes a system level optimization to evaluate the impacts of changing the BSSID or the cooperative group of the selected RH.

In one embodiment, the central controller 100 measures and evaluates network information related to the client devices currently served by the selected RH. For example, the central controller 100 can measure the data traffic through the selected RH, the number of client devices currently served through the selected RH, and the signal quality provided by the selected RH to the currently served client devices. In another example, the central controller 100 can determine whether the client devices currently served by the selected RH have alternative RHs that can provide comparable services to those client devices. In another embodiment, the central controller 100 also measures and evaluates network information related to other client devices currently served by other RHs. Based on the network information, at block 306, the central controller 100 can determine or estimate that after changing the BSSID or the cooperative group of the selected RH, how many client devices can be better served, e.g., have better signal quality or higher data rates.

If the central controller 100 determines that more client devices can be better served by changing the BSSID or the cooperative group of the selected RH, the method 300 proceeds to block 307. At block 307, the central controller 100 assigns or extends the BSSID of the previously selected RH to the selected RH which is shown in FIG. 5B. For example, FIG. 5B illustrates that the central controller 100 extends the BSSID of the previously selected RH 111 to the selected RH 112, according to one embodiment herein. Because the selected RH 112 and the previously selected RH 111 are on the same channel, the central controller 100 adds the selected RH 112 to the cooperative group of RHs 110 and 111, e.g., group 400 as in FIG. 5A, to form a new cooperative group 500. RHs in the new cooperative group 500 have the same BSSID and operate to provide one basic service area (BSA) to the client device. Thus, the selected RH 112 now has the same BSSID as the previously selected RH 111.

At block 308, the selected RH sends the probe response to the roaming client device in response to the first probe request using the extended BSSID. In FIG. 5B, the selected RH 112 sends the probe response 512 to the roaming client device 120 when the roaming client device 120 moves from the second location to the third location of the wireless network 10. The probe response 512 includes the extended BSSID of the selected RH 112, which is the same as the BSSID of the previously selected RH 111.

At block 309, after receiving the probe response through the selected RH 112, the roaming client device 120 may connect through the selected RH 112 without changing the BSSID. In other words, the roaming client device 120 remains associated with the same BSSID, i.e., the BSSID of the previously selected RH 111. In this embodiment, switching from communicating with the previously selected RH 111 through the selected RH 112 is transparent to the roaming client device 120. That is, from the perspective of the roaming client device 120, it remains connected to the same BSA of the wireless network 10.

If the central controller 100 determines that changing the BSSID or the cooperative group of the selected RH does not better serve more client devices, the method 300 proceeds to block 310. At block 310, no RH sends a probe response to the client device in response to the first probe request. In other words, the selected RH does not actually send the probe response to the client device in response to the first probe request, while only the selected RHs with the better BSSID and on the channel of the current probe request will respond.

Figure 6A:
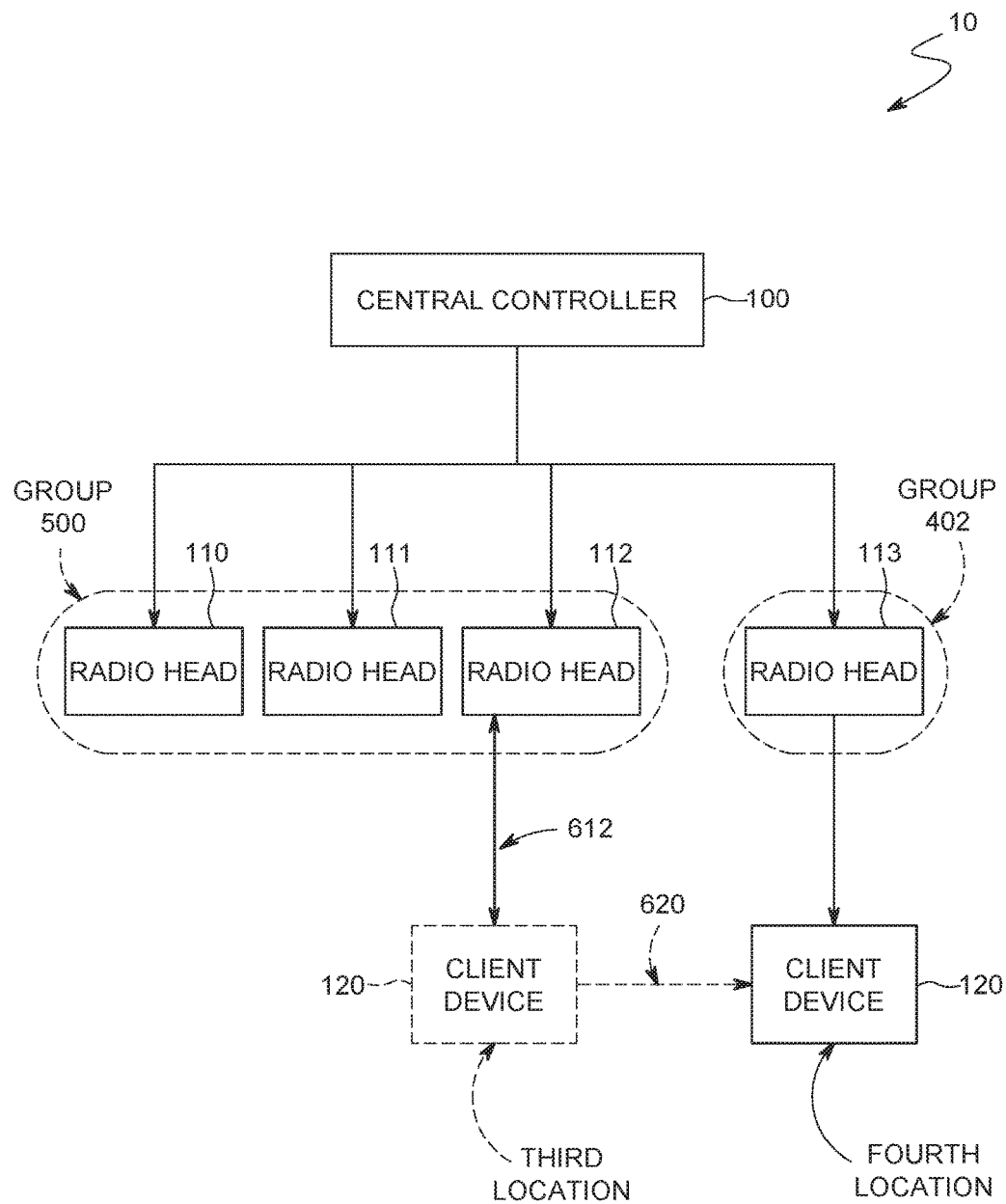
FIG. 6A illustrates that the client device is roaming in the wireless network, according to a third embodiment herein.

Returning to block 305, an example of following the "No" logic leg will be described with parallel reference to FIG. 6A-B. In particular, blocks 311-315 will be described with reference to FIG. 6A-B to illustrate an embodiment in which the selected RH and the previously selected RH are not on the same channel. In one embodiment, after the roaming client device 120 connects through the RH 112, the roaming client device 120 continues to move from the third location to a fourth location of the wireless network 10. FIG. 6A illustrates that the client device 120 roams from the third location to a fourth location of the wireless network 10, according to one embodiment herein. In one embodiment, the fourth location is within the coverage of the RH 113. As shown in FIG. 6A, the client device 120 is currently connected through the RH 112, as indicated by the bi-directional arrow 612 but moves from the third location to a fourth location of the wireless network 10, as indicated by the arrow 620. The roaming client device 120 sends a probe request to seek for a better connection to the wireless network 10, corresponding to block 201 of FIG. 2. After receiving the probe request by the RHs 110-113, the central controller 100 performs blocks 202-207 of the method 200 again to select a RH to send a response to the client device 120 in response to the first probe request. In FIG. 6A, after again performing the method 200 the central controller 100 has selected the RH 113 to send a probe response to the roaming client device 120 according to the method 200 as described above.

In FIG. 6A, the RH 113 is within a different cooperative group 402 from the RHs 110, 111 and 112 and has a different BSSID from the RHs 110, 111 and 112. In FIG. 6A, it is assumed that the selected RH 113 and the previously selected RH 112 are not on the same channel. That is, the selected RH 113 is not currently enabled to support the currently associated BSSID. In the embodiment as shown in FIG. 6A, the answers at blocks 302 and 305 are both "No", and the method 300 then proceeds to block 311.

At block 311, the central controller 100 determines whether more client devices can be better served by changing the BSSID or the cooperative group of the selected RH, similarly as described at block 306.

If at block 311, the central controller 100 determines that more client devices can be better served by changing the BSSID or the cooperative group of the selected RH, the method 300 proceeds to block 312. At block 312, the central controller 100 extends the BSSID to the selected RH, and changes its channel, similarly as shown in FIG. 5B. For example, the central controller 100 can add the selected RH 113 to the cooperative group 500 to form an enhanced cooperative group 600, as shown in FIG. 6B. Thus, the selected RH 113 now has the same BSSID and channel as the previously selected RH 112.

At block 313, the central controller 100 enables the selected RH 113 to support the extended BSSID on the new channel, i.e., the channel of the existing BSSID without sending the probe response to the roaming client device 120 in response to the first probe request. However, the selected RH 113 does not actually send the probe response to the client device in response to the first probe request, because it is no longer on the channel of the probe request. In one embodiment, the selected RH 113 does not actually send the probe response to the client device in response to the first probe request unless the selected RH 113 is already on the channel of the previously selected RH 112.

Figure 6B:
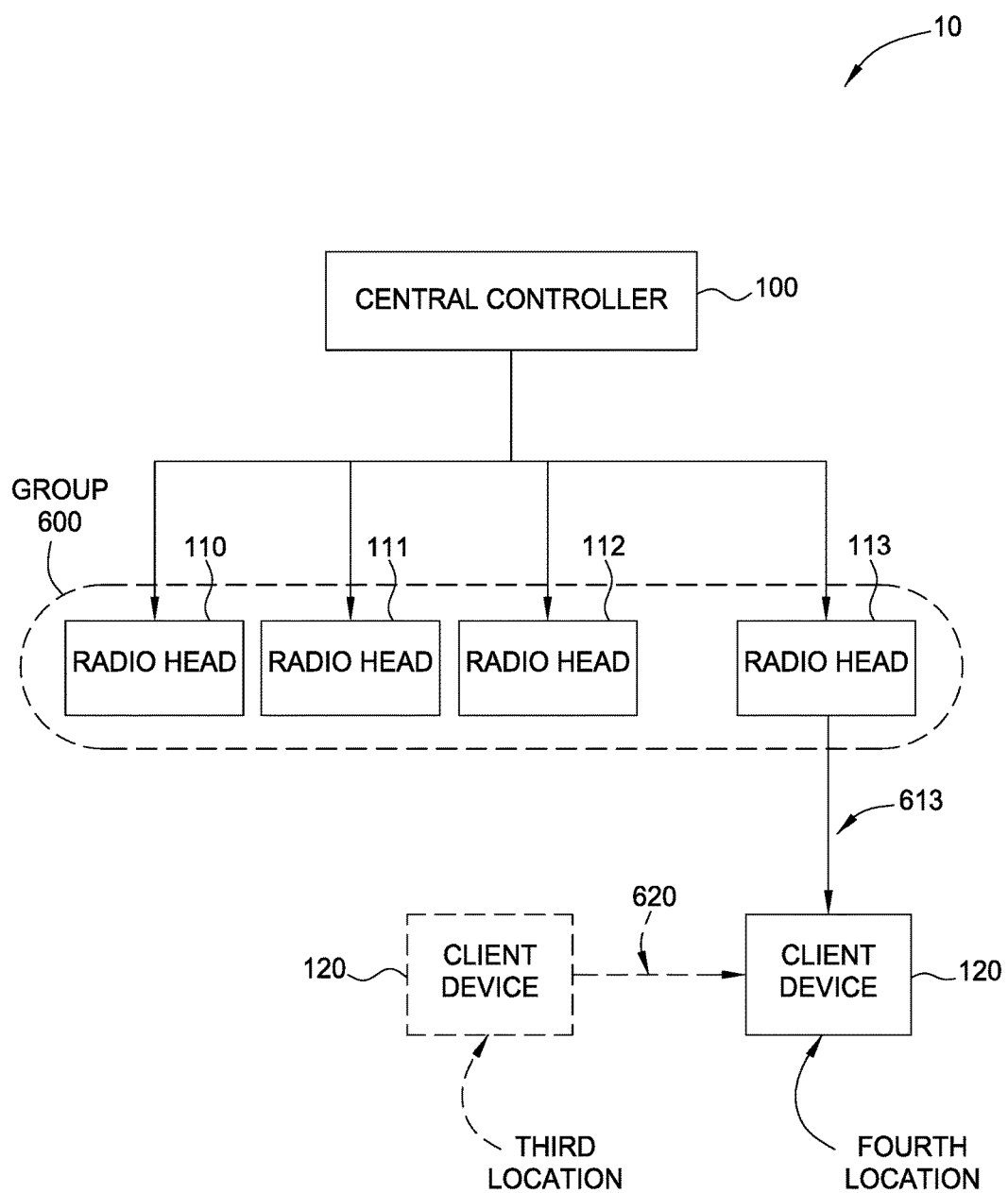
FIG. 6B illustrates that the central controller extends the BSSID of the previously selected RH to the currently selected RH, according to another embodiment herein.

At block 314, the selected RH 113 sends the probe response 613 to the roaming client device 120 in response to a future probe request (a later probe request than the first probe request transmitted by the client device), as shown in FIG. 6B. In one embodiment, the selected RH 113 sends the probe response 613 using a BSSID of the group 600. That is, from the perspective of the moving client device 120, it remains connected to the same BSA of the wireless network 10.

If at block 311, the central controller 100 determines that changing the BSSID or the cooperative group of the selected RH does not better serve more client devices, the method 300 proceeds to block 315. At block 315, the selected RH sends the probe response to the client device using one of its existing BSSID (the central controller 100 determines that the existing BSSID is a better BSSID for the selected RH) in response to the first probe request, similarly as described at block 310.

FIGS. 3-6 describe some embodiments of the present disclosure. In other embodiments, the central controller 100 may control a different number of RHs and/or a different number of cooperative groups. In other embodiments, the cooperative groups may include different numbers of RHs. In other embodiments, the cooperative groups may be on different channels. In other embodiments, multiple client devices may roam in the wireless network and each of the roaming client devices may connect through the selected RH according to the method 300. In other embodiments, one or more client devices may roam between any two locations of the wireless network. For example, the roaming client device 120 may roam quickly from the first location as shown in FIG. 4 to the fourth location as shown in FIG. 6. In this example, the central controller 100 may directly select the RH 113 to send the probe response to the roaming client device 120. Thus, the method 300 may directly go from block 301 to block 302, and from block 302 to block 305, and from block 305 to block 311, as understood in the art.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A central controller, comprising:
    an I/O interface configured to couple to a plurality of radio heads to establish a Wi-Fi network, each radio head comprising at least one antenna and at least one transceiver; and
    a processor;
    a memory containing a program that, when executed on the processor, performs an operation, the operation comprising:
        receiving a first probe request from a network device at a first set of the plurality of radio heads on a first channel of the Wi-Fi network;
        generating network information for the first set of the plurality of radio heads based on the first probe request;
        calculating first respective metric values for the first set of the plurality of radio heads based on the network information;
        calculating second respective metric values for a second set of the plurality of radio heads based on receiving a plurality of frames from the network device using the second set of the plurality of radio heads before the first set of the plurality of radio heads receive the first probe request;
        selecting at least one radio head from the first and the second sets of the plurality of radio heads based on comparing the first and second respective metric values; and
        sending at least one probe response to the network device in response to the first probe request using the selected radio head from the first set, wherein unselected radio heads in the first plurality of radio heads do not respond to the first probe request.

2. The central controller of claim 1, wherein the central controller is configured to provide part or all of the digital part of the physical (PHY) layer function and the media access control (MAC) layer function of an access point (AP) without providing the analog part of the PHY layer function of an AP.

3. The central controller of claim 1, wherein the first and second respective metric values are set based on a capability of the first and the second set of the plurality of radio heads under their current configurations to serve the network device, respectively, and wherein probe responses are sent to the network device in response to the first probe request using only the selected radio head from the first set.

4. The central controller of claim 1, wherein the selection matches a radio head per basic service set identifier (BSSID), for each BSSID that has a radio head with a metric value within a tolerance from a best metric value of the first respective metric values.

5. The central controller of claim 1, wherein the selection is independently evaluated per service set identifier (SSID) offered by the central controller.

6. The central controller of claim 1, wherein the network device is already connected through a first radio head of the plurality of radio heads to a first BSSID before transmitting the first probe request, and wherein the selected radio head supports the first BSSID as the first radio head.

7. The central controller of claim 1, wherein the network device is already connected through a first radio head of the plurality of radio heads to a first BSSID before transmitting the first probe request, and the operation further comprising:
   upon determining that the selected radio head is not currently enabled to support the first BSSID, enabling the selected radio head to support the first BSSID as the first radio head on the channel of the first radio head; and
   not sending the probe response to the network device in response to the first probe request from the selected radio head unless the selected radio head is already on the channel of the first radio head.

8. A computer program product, comprising:
a non-transitory computer-readable storage medium having computer-readable program code embodied therewith, wherein the computer-readable program code is configured to:
   receive a first probe request from a network device at a first set of a plurality of radio heads on a first channel of a Wi-Fi network, wherein the plurality of radio heads is coupled to a central controller and establish the Wi-Fi network;
   generate, by the central controller, network information for the first set of the plurality of radio heads based on the first probe request;
   calculate first respective metric values for the first set of the plurality of radio heads based on the network information;
   calculate second respective metric values for a second set of the plurality of radio heads based on receiving a plurality of frames from the network device using the second set of the plurality of radio heads before the first set of the plurality of radio heads receive the first probe request;
   select at least one radio head from the first and the second sets of the plurality of radio heads based on comparing the first and second respective metric values; and
   send at least one probe response to the network device in response to the first probe request using the selected radio head from the first set, wherein unselected radio heads in the first plurality of radio heads do not respond to the first probe request.

9. The computer program product of claim 8, wherein the central controller is configured to provide part or all the digital part of the physical (PHY) layer function and the media access control (MAC) layer function of an access point (AP) without providing the analog part of the PHY layer function of an AP.

10. The computer program product of claim 8, wherein the first and second respective metric values are set based on a capability of the first and the second set of the plurality of radio heads under their current configurations to serve the network device, respectively, and wherein probe responses are sent to the network device in response to the first probe request using only the selected radio head from the first set.

11. The computer program product of claim 8, wherein the selection matches a radio head per basic service set identifier (BSSID), for each BSSID that has a radio head with a metric value within a tolerance from a best metric value of the first respective metric values.

12. The computer program product of claim 8, wherein the selection is independently evaluated per service set identifier (SSID) offered by the central controller.

13. The computer program product of claim 8, wherein the network device is already connected through a first radio head of the plurality of radio heads to a first BSSID before transmitting the first probe request, and wherein the selected radio head supports the first BSSID as the first radio head.

14. The computer program product of claim 8, wherein the network device is already connected through a first radio head of the plurality of radio heads to a first BSSID before transmitting the first probe request, and wherein the computer-readable program code is further configured to:
   upon determining that the selected radio head is not currently enabled to support the first BSSID, enable the selected radio head to support the first BSSID as the first radio head on the channel of the first radio head; and
   not send the probe response to the network device in response to the first probe request from the selected radio head unless the selected radio head is already on the channel of the first radio head.

15. A method, comprising:
   receiving a first probe request from a network device at a first set of a plurality of radio heads on a first channel of a Wi-Fi network, wherein the plurality of radio heads is coupled to a central controller and establish the Wi-Fi network;
   generating, by the central controller, network information for the first set of the plurality of radio heads based on the first probe request;
   calculating first respective metric values for the first set of the plurality of radio heads based on the network information;
   calculating second respective metric values for a second set of the plurality of radio heads based on receiving a plurality of frames from the network device using the second set of the plurality of radio heads before the first set of the plurality of radio heads receive the first probe request;
   selecting at least one radio head from the first and the second sets of the plurality of radio heads based on comparing the first and second respective metric values; and
   sending at least one probe response to the network device in response to the first probe request using the selected radio head from the first set, wherein unselected radio heads in the first plurality of radio heads do not respond to the first probe request.

16. The method of claim 15, wherein the central controller is configured to provide part or all the digital part of the physical (PHY) layer function and the media access control (MAC) layer function of an access point (AP) without providing the analog part of the PHY layer function of an AP.

17. The method of claim 15, wherein the first and second respective metric values are set based on a capability of the first and the second set of the plurality of radio heads under their current configurations to serve the network device, respectively, and wherein probe responses are sent to the network device in response to the first probe request using only the selected radio head from the first set.

18. The method of claim 15, wherein the selection matches a radio head per basic service set identifier (BSSID), for each BSSID that has a radio head with a metric value within a tolerance from a best metric value of the first respective metric values.

19. The method of claim 15, wherein the selection is independently evaluated per service set identifier (SSID) offered by the central controller.

20. The method of claim 15, wherein the network device is already connected through a first radio head of the plurality of radio heads to a first BSSID before transmitting the first probe request, and wherein the selected radio head supports the first BSSID as the first radio head.

* * * * *